United States Patent
Cao et al.

(10) Patent No.: US 7,139,733 B2
(45) Date of Patent: Nov. 21, 2006

(54) METHOD AND STRUCTURE FOR BID WINNING PROBABILITY ESTIMATION AND PRICING MODEL

(75) Inventors: Heng Cao, Yorktown Heights, NY (US); Roger R. Gung, Yorktown Heights, NY (US); Yunhee Jang, Poughkeepsie, NY (US); Richard D. Lawrence, Ridgefield, CT (US); Grace Lin, Chappaqua, NY (US); Yingdong Lu, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 10/120,407

(22) Filed: Apr. 12, 2002

(65) Prior Publication Data

US 2003/0195832 A1    Oct. 16, 2003

(51) Int. Cl.
*G06Q 40/00* (2006.01)
(52) U.S. Cl. .................... 705/37; 705/1; 705/36
(58) Field of Classification Search ............ 187/127, 187/131, 138; 705/1, 35–40
See application file for complete search history.

(56) References Cited

U.S. PATENT DOCUMENTS

| | | | | |
|---|---|---|---|---|
| 5,243,155 A * | 9/1993 | Sirag, Jr. | | 187/127 |
| 5,252,789 A * | 10/1993 | Sirag, Jr. et al. | | 187/127 |
| 5,260,526 A * | 11/1993 | Sirag, Jr. | | 187/127 |
| 5,260,527 A * | 11/1993 | Sirag, Jr. | | 187/127 |
| 5,826,244 A * | 10/1998 | Huberman | | 705/37 |
| 5,974,403 A * | 10/1999 | Takriti et al. | | 705/412 |
| 6,401,080 B1 * | 6/2002 | Bigus et al. | | 705/37 |
| 6,415,270 B1 * | 7/2002 | Rachson et al. | | 705/37 |

FOREIGN PATENT DOCUMENTS

EP    1 054 336 A2 *    11/2000

OTHER PUBLICATIONS

Business Wire, Bid.com Announces www.dutchauction.com, Oct. 28, 1998, Dialog file 16, Accession No. 05914806.*

* cited by examiner

*Primary Examiner*—Frantzy Poinvil
(74) *Attorney, Agent, or Firm*—Stephen C. Kaufman, Esq.; McGinn IP Law Group, PLLC

(57) ABSTRACT

A method (and structure) for developing a distribution function for the probability of winning a bid by a seller for a product or service, using the seller's own historical data for winning bids and lost bids, includes normalizing the data for winning bids and the data for lost bids and merging the normalized data into a single set of data.

15 Claims, 4 Drawing Sheets

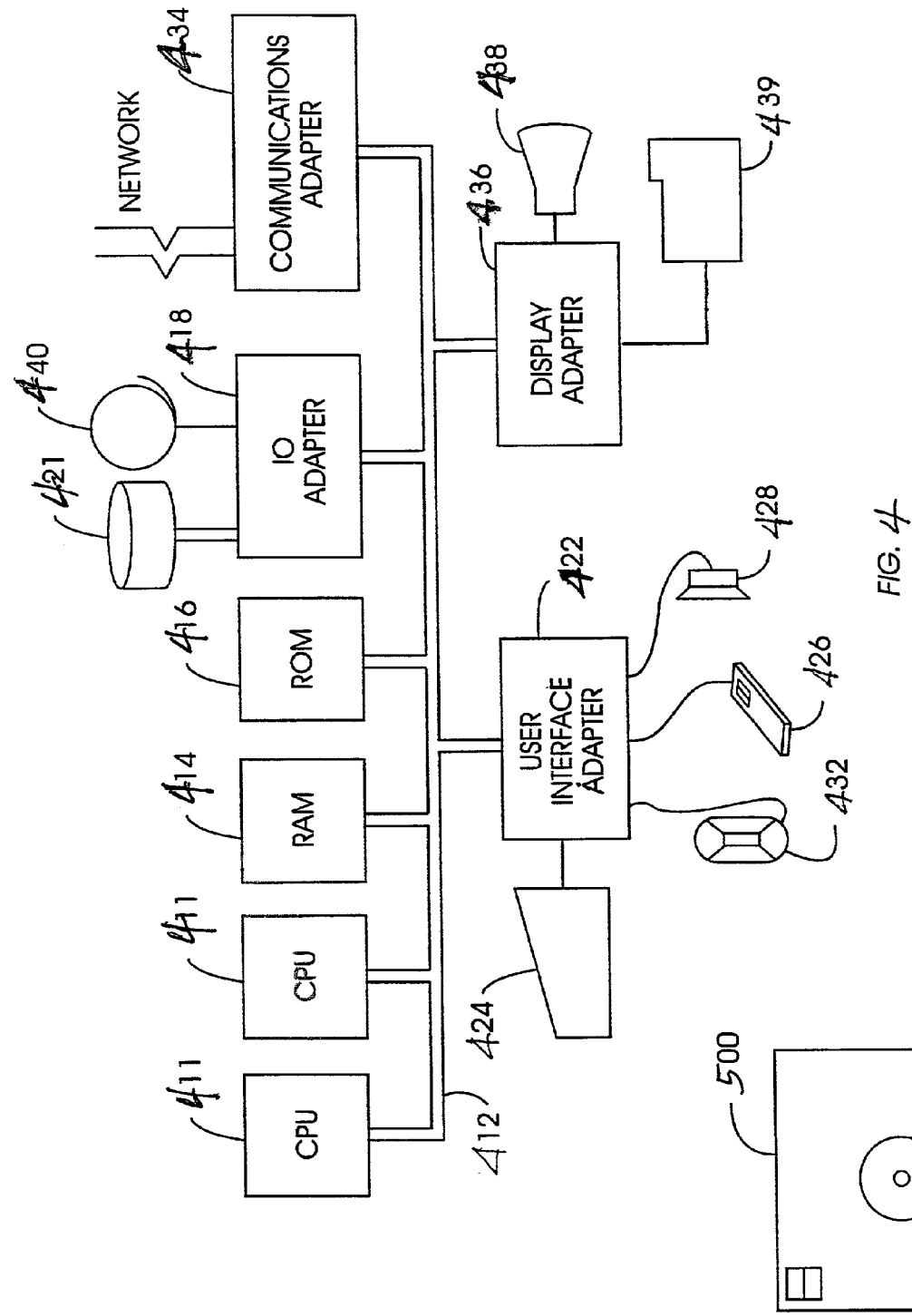

ically relates to developing an expected winning probability distribution in response to a customer request for a price quote. More specifically, only the seller's internal historical win/loss bid data is used as a prediction of competitors' pricing and for development of the expected winning probability distribution.

METHOD AND STRUCTURE FOR BID WINNING PROBABILITY ESTIMATION AND PRICING MODEL

BACKGROUND OF THE INVENTION

1. Field of the Invention

The present invention generally relates to developing an expected winning probability distribution in response to a customer request for a price quote. More specifically, only the seller's internal historical win/loss bid data is used as a prediction of competitors' pricing and for development of the expected winning probability distribution.

2. Description of the Related Art

A business-to-business (b2b) direct selling process begins with a customer's request for price quote for the products specified in a high level description. Then, it is the responsibility of a sales representative or pricing agent to come up with a reasonable price range that can be offered. If the price quote is too high, then a high profit will be expected, but the probability that the bid is materialized is very low.

If the price quote is too low, then there is an expected high probability of obtaining this bid, but the profit level would be very low. For this reason, sales representatives must be equipped with a smart pricing decision support tool, which can provide useful information such as expected winning probability level and expected revenue (or profit) for each price quote.

In the conventional model, a knowledge of the competitors' win/loss distribution is required, either by obtaining actual data about the competitor or by making assumptions. Although assumptions of competitors' behavior make price modeling easier, models developed from these assumptions inherently lack the realism of models based on actual data. What is missing in the conventional methods is a method that relies only on information readily available to a seller.

SUMMARY OF THE INVENTION

In view of the foregoing and other problems, drawbacks, and disadvantages of the conventional systems, it is an object of the present invention to provide a method (and structure) in which a winning probability estimate is developed, as based exclusively on the offeror's own historical bid data.

It is another object of the present invention to provide a method to use internal historical bidding data to develop a normalizing factor which is then used to develop a winning probability estimate.

In order to achieve the above goals and objects, as a first aspect of the present invention, described herein is a method (and structure) for developing a distribution function for the probability of winning a bid by a seller for a product or service, using the seller's own historical data for won bids and lost bids, including normalizing the data for winning bids and the data for lost bids and merging the normalized data into a single set of data.

As a second aspect of the present invention, also described herein is a signal-bearing medium tangibly embodying a program of machine-readable instructions executable by a digital processing apparatus to perform the above-described method.

The present invention provides an advantage over the conventional methods of developing an expected winning probability estimate by providing a method as based exclusively on the offeror's own historical bid data without knowledge of a competitor's win/loss distribution.

BRIEF DESCRIPTION OF THE DRAWINGS

The foregoing and other objects, aspects and advantages will be better understood from the following detailed description of a preferred embodiment of the invention with reference to the drawings, in which:

FIG. 4 illustrates an exemplary hardware/information handling system 400 for incorporating the present invention therein; and FIG. 5 illustrates a signal bearing medium 500 (e.g., storage medium) for storing steps of a program of a method according to the present invention.

DETAILED DESCRIPTION OF A PREFERRED EMBODIMENT OF THE INVENTION

Figure 1:
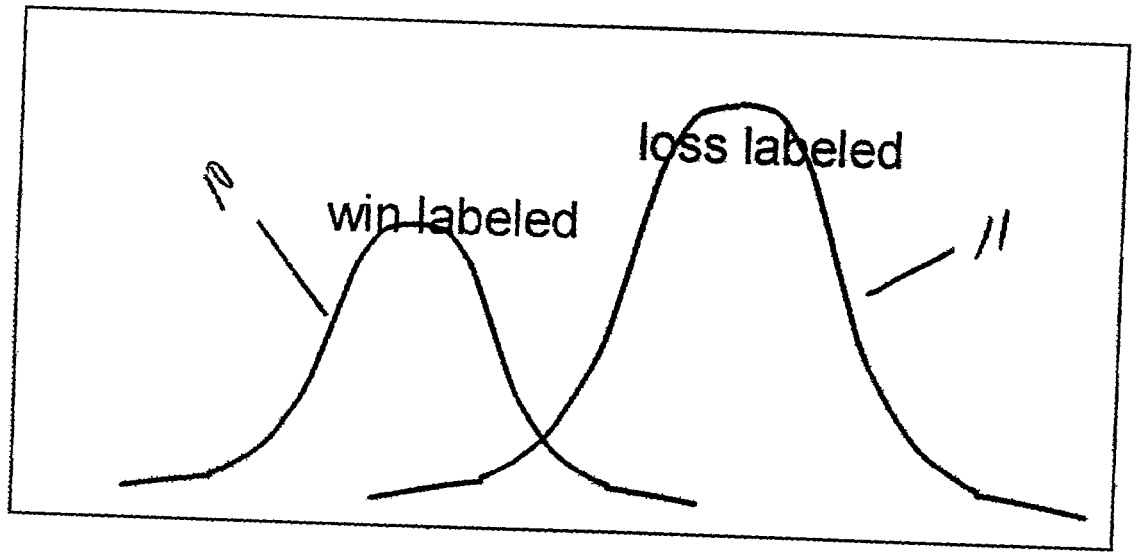
FIG. 1 shows an exemplary graph using an offeror's internal data for past bids, with the data for the won bids on the left-hand side of the drawing and the bids for the lost bids on the right-hand side of the drawing.

Referring now to the drawings, and more particularly to FIG. 1, which shows a distribution of historical bid data relative to competitors, in which the data for the winning bids appears in the left bell-shaped graph 10 and data for the lost bids appears in the right graph 11. This internal data can become the basis of an expected winning probability distribution by reasoning as follows.

First, the left-hand graph 10, by representing the price data that won the bids, is therefore presumed to be at least slightly below the competitor's corresponding bid amounts. Therefore, by increasing slightly the data of this curve, the resultant shifted curve represents a set of midway bids that would be an optimal winning set of bids. This data increase would be a shifting to the right of the left-hand curve.

Similarly, the right-hand graph 11 contains the data for bids lost to this competitor and indicates that the data in this curves is at least slightly higher relative to the bid of the competitor. Presumably, decreasing slightly the price data of this curve by shifting the right-hand curve slightly to the left would represent a set of prices that would have won those bids.

The present invention uses the above described strategy of taking historical internal bidding data and normalizing it appropriately to merge the win bid data with the lost bid data to become an expected winning probability distribution.

Hybrid Bid Pricing Model

Figure 2:
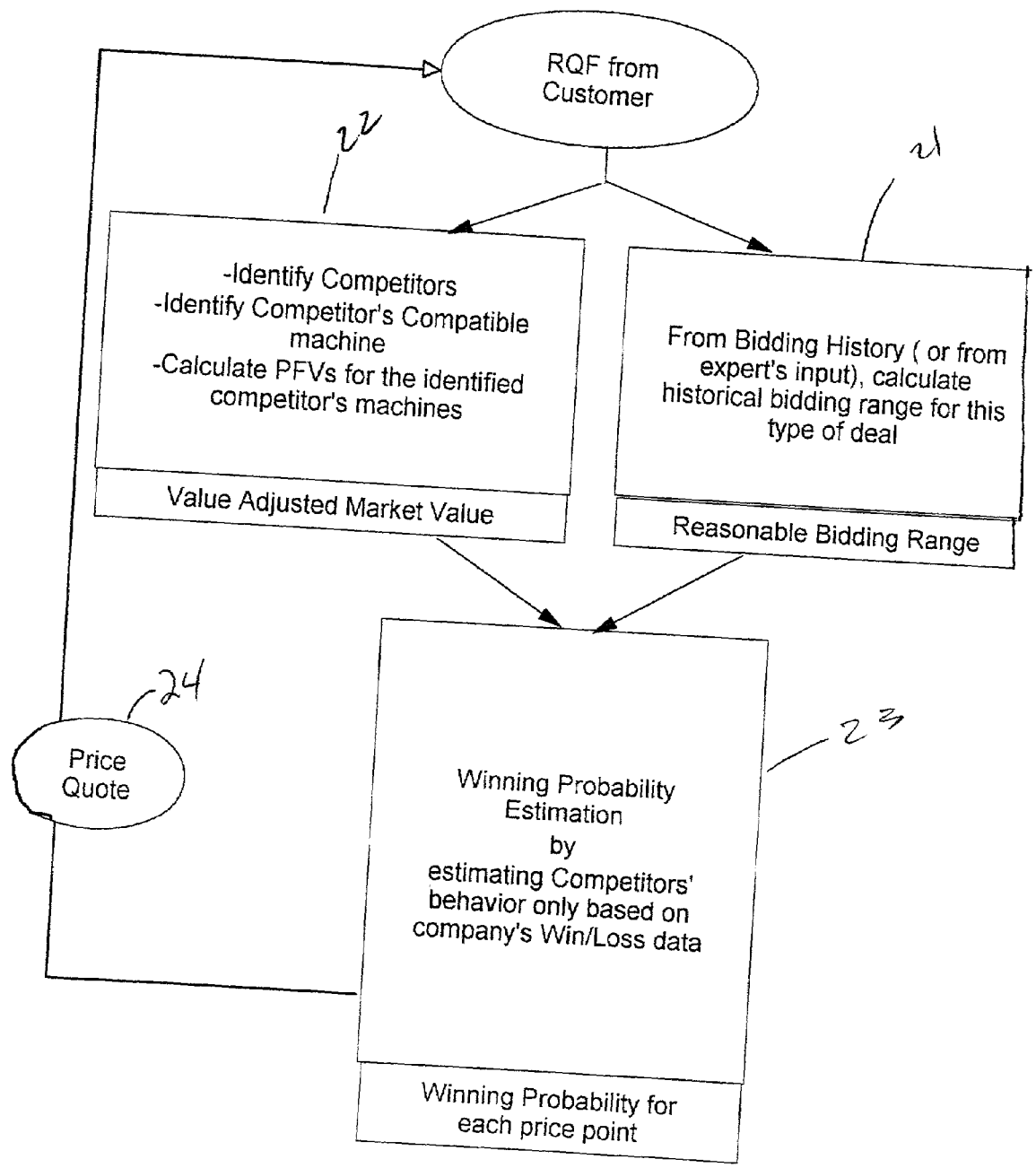
FIG. 2 shows the exemplary graph of win/loss data after having been normalized and merged.

As shown in FIG. 2, in the modeling technique of the present invention, both statistical analysis 21 on the historical data and decision maker's inputs 22 are required to predict the competitor's behavior on bids being requested 23. Throughout this model, fine-grained customer segmentation and product-grouping is assumed, which should lead to a reasonable bid price range where the eventual winning price (e.g., price quote 24) is expected to settle.

Figure 3:
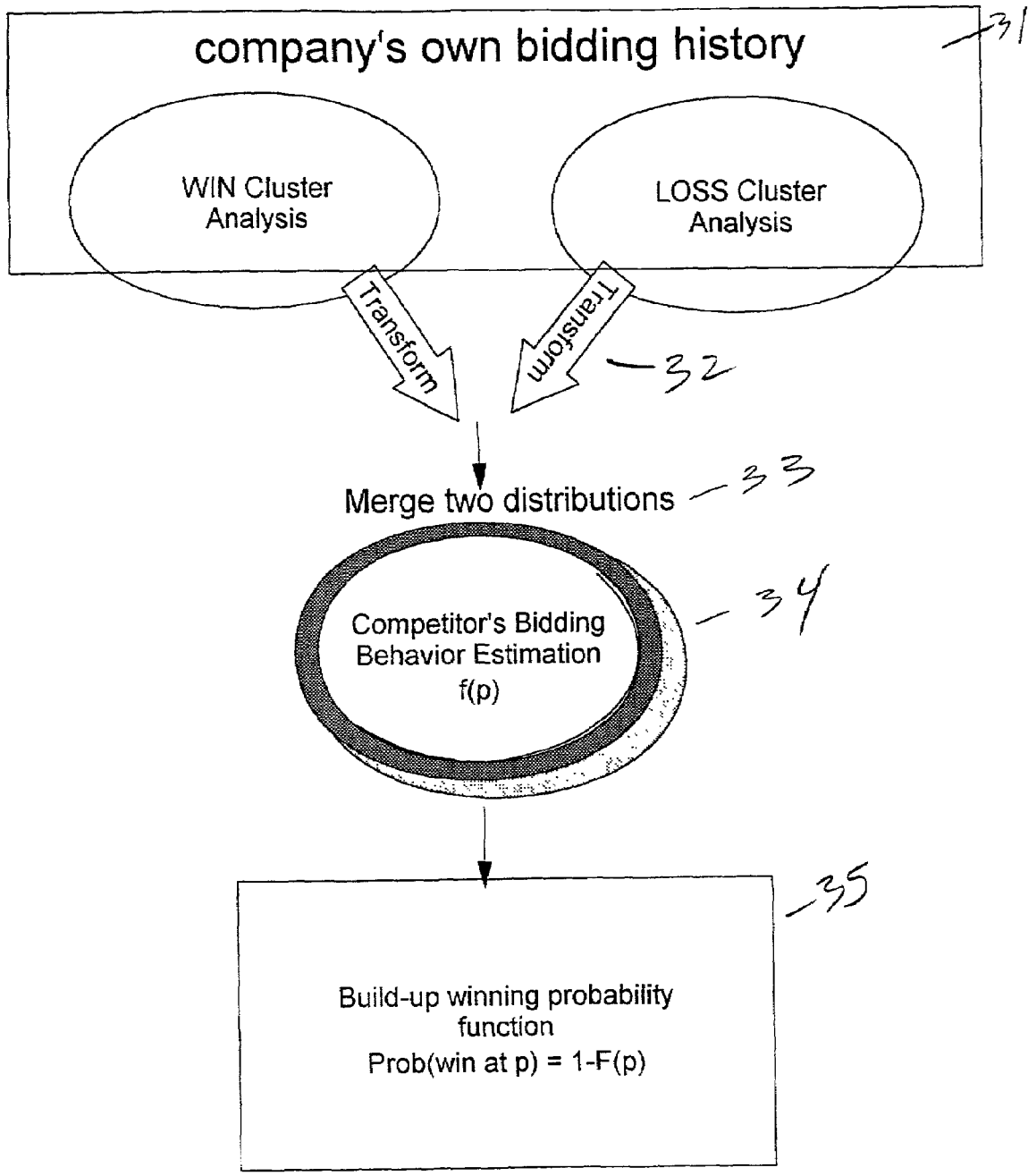
FIG. 3 shows an exemplary expected winning probability curves, as resulting from the merged win/loss graph.

In FIG. 3 is shown an exemplary embodiment of the present invention. The seller's internal bidding history 31 is normalized 32 so that the win data and loss data can be merged 33 into an estimation 34 of the competitors' bidding behavior. A winning probability function 35 is built from this data. The process is described below, and a specific example is provided afterwards.

Step -1: Bid Offering Price Normalization

In the present invention, the value-adjusted Market Price (VAMP) is used as a normalizing factor. Also, the Price Function Value (PFV) index is used to calculate the competitor's value-adjusted List Price. PFV is an output of brand specific competitive analysis.

A novel approach of the present invention is that of using PFV (Price Function Value) index to calculate competitor's value-adjusted list price. This unique interpretation allows this index to be used as a strategic indicator for competitive pricing as well as internal pricing. PFV is used to estimate the list price that competitor would put for the matching configuration.

Price_Ratio=Approved_Price/value-adjusted Market Price

VAMP (value-adjusted Market Price)=SUM (market share*value-adjusted list price)

VALP (value-adjusted List Price)=company (IBM)'s list price*competitor's PFV

Step-2: Price Range Estimation

Applying price normalization technique in<STEP-1>, a price range is estimated in terms of Price-Ratio. In most of the cases, Price-Ratio will be between 0 and 1. From historical data for this segment at the expected competition rate, the Price_Ratio range is estimated as follows.

For the lowest bid Price_Ratio, the Mean of final offering price−K*standard deviation is used. For the highest bid Price_Ratio, the Mean of final offering price+K * standard deviation is used. K is a control variable and can be determined according to a decision maker's utility function.

Step-3: Winning Probability Estimation Against Price_Ratio

Suppose there were k competitors in the bidding. From the history of winning and losing bids with final offering prices, estimate f(p,k), the probability that k competitors' bidding Price_Ratio is higher than p.

Based on the "WIN" history, it is known that other competitors' bidding price was higher than the final win price. That is, it is possible to build f(p+delta_1, k), the probability that k-competitors' bidding price was higher than p+delta_1.

Based on the "LOSS" history, it is then straightforward to develop the function f(p-delta_2, k), the probability that k-competitors' bidding price was higher than p-delta_2. Note that delta_1 is the price difference between the company's win price and the lowest price among competitors, and delta_2 is the price difference between the company's losing price and the lowest price among competitors.

Now there are two estimators for the competitors' bidding behavior. To have two estimators with a least statistical difference, delta_1 and delta_2 are adjusted to have the same expected mean.

Without loss of generality, it can be assumed that the company's losing bid lies on the midrange of the losing bids. Then delta_2 is the distance between the first and median of the bids, while delta_1 is the distance between the first and the second of the bids. Now following this reasoning, delta_1 and delta_2 are adjusted in the ratio of 1 to ((k/2)+1).

The two data sets are now merged to finalize f(p,k) based on the whole (both WIN and LOSS) data.

This model also can be extended to make delta_1 and delta_2 as random variables. This demonstrates that this model can accommodate the cases where pricing itself is not the primary factor to determine winning status.

Step-4: Calculate Price Elasticity Factor and Shift Estimate

The price elasticity factor is now calculated for this segment at this competition rate k. As such, the Winning Probability Estimation is shifted up or down according to the calculated price elasticity factor for this bids.

Using the winning probability estimation, the pricing agent can use this information to finalize an offering price under their winning probability target.

EXAMPLE

The following example is provided to clarify details of the present invention. In this example, Customer_A asked for a price quote for 1,000 units of machine_M. To support Pricer's pricing decision, the Pricing Optimization Tool proceeds in the following sequences:

1. Price Normalization:

For Machine_M, three competitors' compatible Machines are identified.

TABLE 1

Competitor's compatible machines and PFVs

| Company name | Machine Name | List Pice ($) | PFV | Market Share (%) |
|---|---|---|---|---|
| My_Company | I-M | 3,349 | — | 25 |
| Competitor_1 | C1-M | 2,316 | 1.32 | 30 |
| Competitor_2 | C2-M | 2,799 | 1.09 | 30 |
| Competitor_3 | C3-M | 2,455 | 1.16 | 15 |

Now, PFVs are used to calculate competitor' offering prices when competitors build their machines with exactly same configuration as My_Company's I-M. For instance, Competitor_1's PFV for machine_M is 1.32. When Competitor_1 reconfigures C1_M in the exactly same configuration as My_Company's machine I-M, its list price would be 3,349/1.32=($)2,537.

TABLE 2

Competitor's price when they manufacture same quality machine as My_Company

| Company name | My_Company's Price | PFV | Competitor's VALP (Value-Adjusted List Price) |
|---|---|---|---|
| Competitor_1 | 3,349 | 1.32 | 3.349/1.32=2,537 |
| Competitor_2 | 3,349 | 1.09 | 3.349/1.09=3,251 |
| Competitor_3 | 3,349 | 1.16 | 3.349/1.16=2,887 |

To calculate fair market list price of machine_M, the competitor's VALP and its market share is used, as follows:

VAMP (Value Adjusted Market Price) = SUM of (market_share*VALP)

| Company name | VALP | Market Share | VALP*Market Share |
|---|---|---|---|
| My_Company | 3,349 | 25 | 837.25 |
| Competitor_1 | 2,537 | 30 | 761.1 |
| Competitor_2 | 3,251 | 30 | 975.3 |
| Competitor_3 | 2,887 | 15 | 433.05 |

SUM = 3,006.70

All the final Approved Prices is now normalized by VAMP, which is $3,006.7 in this example:

Normalized Price Ratio=(Approved-Price)/*VAMP*.

2. Price Range Estimation

Based on either the historical bidding data or expert's input, a reasonable price range is determined for this bid. Suppose in history, normalized price ratios for the bids with similar bidding characteristics is:

Price-Ratio for this type of bids in history~ (Mean=0.8 and Standard-Deviation=0.04)

Then, reasonable price range for the current bid would be:

$0.8-(1.97)*0.04 \leq$ offering_price_for_this_bid $\leq 0.8+(1.97)*0.04$

This is the step where K can be set, e.g., K=1.97, where K is a control variable which can be adjusted according to pricer's judgment for this deal. In this sense, price range estimation is somewhat strategic decision making for the bid. Price_Range_Estimation now would be the range (0.7212, 0.8788).

3. Winning Probability Estimation 3-1. Winning bids' price ratio estimation:

Select only the winning bids from the bidding history and calculate sample MEAN of this Win cluster. In this example, Mean (price ratio of winning bids)=0.85

3-2. Losing bids' price ratio estimation:

Select only the losing bids from the bidding history and calculate the sample MEAN of this Loss Cluster.

Mean(price ratio of losing bids) =0.75

3-3. Competitor's bidding behavior construction:

In this example there are three competitors (Competitor_1, Competitor_2, and Competitor_3) identified in the current bid. Including My-Company, the competition rate in this bid is four. Since $\delta_{win}$ and $\delta_{loss}$ is defined as the distance between (First Lowest and Second Lowest) and (First Lowest and Median=2.5), respectively, the ratio between $\delta_{win}$ and $\delta_{loss}$ would be:

$\delta_{win}:\delta_{loss}$=distance(first,second):distance(first,median)=(2-1):(2.5-1)=1:1.5

Now the Win and Loss prices in the ratio of (1 to 1.5) are moved to have same cluster MEANs. That is, $$\delta_{win} = \text{Difference(Win and Loss Cluster MEANs)} \times 1.0/(1.0+1.5)$$
$$= (0.85-0.75) \times (1/2.5) = 0.04$$
$$\delta_{loss} = (0.85-0.75) \times (1.5/2.5) = 0.06$$

TABLE 4

Win and Loss Price Ratios are adjusted to induce Competitor's bidding price

| BID_NO | Win/Loss status | Final Offering Price Ratio | Adjusted By $\delta_{win}$ and $\delta_{loss}$ |
|---|---|---|---|
| 1 | Win | 0.85 | $(0.85\ \delta_{win})$ = 0.85 −0.04 = 0.81 |
| 2 | Loss | 0.78 | $(0.78 + \delta_{loss}) = 0.78 +0.06 = 0.84$ |

TABLE 4-continued

Win and Loss Price Ratios are adjusted to induce Competitor's bidding price

| BID_NO | Win/Loss status | Final Offering Price Ratio | Adjusted By $\delta_{win}$ and $\delta_{loss}$ |
|---|---|---|---|
| 3 | Loss | 0.75 | 0.75 + 0.06 = 0.81 |
| 4 | Win | 0.86 | 0.86 − 0.04 = 0.82 |
| ... | | | |
| 10,000 | Loss | 0.76 | 0.76 + 0.06 = 0.82 |

Using the last column of Table 4, the competitor's bidding behavior distribution (i.e., estimate its Mean and standard deviation for this column) is estimated. In this example, Competitor's Bidding Behavior Distribution $f(p)$~ Normal (Mean=0.79, STD=0.07).     (1)

To establish Winning Probability function from this competitor's bidding behavior distribution, the following relationship is noticed between the two:

Probability (Winning at Offering Price=$p$)=Probability(Competitor's Offering Price>$p$).

Let F(p) be the cumulative distribution of f(p). Then

Winning_Probability($p$)=1−$F(p)$     (2)

(Example) When the offering price is $2,345, its price ratio (=offering_price/Value-Adjusted Market Price) is 0.78(=2,345/3,006.7). To find out Winning Probability at this price point, use (2).

Winning_Probability(0.78)=1−$F$((0.78−0.79)/0.07)= 1−$F$(−0.143)=0.557

Note that F(.) can be obtained from the Normal Distribution table. In this example, estimated winning probability at $2,345 is 55.7% for this bid.

4. Optimal Pricing (Optional)

Using the winning probability estimation, pricing agents finalize offering price within his/her winning probability target.

If the objective of pricing decision is to maximize expected profit from this bid, then the pricer can proceed to the next step with the estimated winning probability function above but this step is irrelevant to the present invention.

Exemplary Hardware Implementation

FIG. 4 illustrates a typical hardware configuration of an information handling/computer system in accordance with the invention and which preferably has at least one processor or central processing unit (CPU) 411.

The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a personal area network (PAN), etc., and a display adapter 436 for connecting the bus 412 to a display device 438 and/or printer 439 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 411 and hardware above, to perform the method of the invention.

This signal-bearing media may include, for example, a RAM contained within the CPU 411, as represented by the fast-access storage for example. Alternatively, the instructions may be contained in another signal-bearing media, such as a magnetic data storage diskette 500 (FIG. 5), directly or indirectly accessible by the CPU 411.

Whether contained in the diskette 500, the computer/CPU 411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computerized method of developing a distribution function for the probability of winning a bid by a seller for a product or service, using the seller's own historical data for winning bids and lost bids, said method comprising:
   normalizing said data for winning bids and said data for lost bids;
   merging said normalized data into a single set of data; and
   using a computer, calculating a winning probability function using said merged normalized data as a cumulative distribution function;
   wherein a normalization factor for said normalizing comprises at least one of:
   a price function value (PFV) index, said PFV index defined as an adjustment in price as if equal features were incorporated into said product or service; and
   a value-adjusted market price (VAMP), said VAMP defined as an adjustment in price as if equal quality were incorporated into said product or service.

2. The method of claim 1, further comprising:
   estimating a price range for said product or service.

3. The method of claim 2, wherein said price range comprises a range as offset from a mean of said merged normalized data.

4. The method of claim 3, wherein said price range comprises said mean $-/+K$ * standard deviation of said merged normalized data, where K comprises a control variable determined according to a decision maker's utility function.

5. The method of claim 3, wherein said mean of said merged normalized data comprises a value calculated by shifting a mean of said winning bids and shifting a mean of said lost bids.

6. A signal-bearing medium tangibly embodying a program of machine-readable instructions executable by a digital processing apparatus to perform a method of developing a distribution function for the probability of winning a bid by a seller for a product or service, using the seller's own historical data for winning bids and lost bids, said method comprising:
   normalizing said data for winning bids and said data for lost bids;
   merging said normalized data into a single set of data; and
   calculating a winning probability function using said merged normalized data as a cumulative distribution function;
   wherein a normalization factor for said normalizing comprises at least one of;
   a price function value (PFV) index, said PFV index defined as an adjustment in price
   as if equal features were incorporated into said product or service; and
   a value-adjusted market price (VAMP), said VAMP defined as an adjustment in price as if equal quality were incorporated into said product or service.

7. The signal-bearing medium of claim 6, said method further comprising:
   estimating a price range for said product or service.

8. The signal-bearing medium of claim 7, wherein said price range comprises a range as offset from a mean of said merged normalized data.

9. The signal-bearing medium of claim 8, wherein said price range comprises said mean $-/+K$ * standard deviation of said merged normalized data, where K comprises a control variable determined according to a decision maker's utility function.

10. The signal-bearing medium of claim 8, wherein said mean of said merged normalized data comprises a value calculated by shifting a mean of said winning bids and shifting a mean of said lost bids.

11. A system for developing a distribution function for the probability of winning a bid by a seller for a product or service, using the seller's own historical data for winning bids and lost bids, said system comprising:
   a normalizer to normalize said data for winning bids and said data for lost bids;
   a merger to merge said normalized data into a single set of data; and
   a calculator for calculating a winning probability function using said merged normalized data as a cumulative distribution function;
   wherein a normalization factor for said normalizing comprises at least one of:
   a price function value (PFV) index, said PFV index defined as an adjustment in price as if equal features were incorporated into said product or service; and
   a value-adjusted market price (VAMP), said VAMP defined as an adjustment in price as if equal quality were incorporated into said product or service.

12. The system of claim 11, further comprising:
   an estimator for estimating a price range for said product or service.

13. The system of claim 12, wherein said price range comprises a range as offset from a mean of said merged normalized data.

14. The system of claim 13, wherein said price range comprises said mean $-/+K$ * standard deviation of said merged normalized data, where K comprises a control variable determined according to a decision maker's utility function.

15. The system of claim 13, wherein said mean of said merged normalized data comprises a value calculated by shifting a mean of said winning bids and shifting a mean of said lost bids.

* * * * *